US009287043B2

(12) United States Patent
Lee et al.

(10) Patent No.: US 9,287,043 B2
(45) Date of Patent: Mar. 15, 2016

(54) MULTILAYER CERAMIC ELECTRONIC COMPONENT HAVING CONTROLLED DIFFERENCE IN CONTINUITY BETWEEN INTERNAL ELECTRODES AND METHOD OF MANUFACTURING THE SAME

(71) Applicant: SAMSUNG ELECTRO-MECHANICS CO., LTD., Suwon, Gyunggi-do (KR)

(72) Inventors: Yoon Hee Lee, Gyunggi-do (KR); Ye Jun Park, Gyunggi-do (KR); Ro Woon Lee, Gyunggi-do (KR)

(73) Assignee: SAMSUNG ELECTRO-MECHANICS CO., LTD., Gyunggi-Do (KR)

( * ) Notice: Subject to any disclaimer, the term of this patent is extended or adjusted under 35 U.S.C. 154(b) by 143 days.

(21) Appl. No.: 13/899,416

(22) Filed: May 21, 2013

(65) Prior Publication Data
US 2014/0063685 A1    Mar. 6, 2014

(30) Foreign Application Priority Data

Sep. 4, 2012 (KR) .................. 10-2012-0097581

(51) Int. Cl.
*H01G 4/008* (2006.01)
*H01G 4/12* (2006.01)
*H01G 4/30* (2006.01)
*H01G 4/005* (2006.01)

(52) U.S. Cl.
CPC ............. *H01G 4/008* (2013.01); *H01G 4/005* (2013.01); *H01G 4/12* (2013.01); *H01G 4/30* (2013.01)

(58) Field of Classification Search
CPC ......... H01G 4/008; H01G 4/30; H01G 4/005; H01G 4/12
See application file for complete search history.

(56) References Cited

U.S. PATENT DOCUMENTS

| | | | | | |
|---|---|---|---|---|---|
| 5,266,762 | A | * | 11/1993 | Hoffman et al. | ............... 219/779 |
| 5,481,428 | A | * | 1/1996 | Lauf et al. | ...................... 361/305 |
| 8,570,710 | B2 | * | 10/2013 | Kim et al. | ................... 361/321.2 |
| 2008/0212257 | A1 | * | 9/2008 | Sakamoto et al. | ............ 361/305 |
| 2011/0141652 | A1 | * | 6/2011 | Chang et al. | .................... 361/272 |
| 2012/0099241 | A1 | * | 4/2012 | Chang et al. | ................. 361/301.4 |
| 2012/0147521 | A1 | * | 6/2012 | Kim et al. | ................... 361/321.2 |

FOREIGN PATENT DOCUMENTS

| | | | | |
|---|---|---|---|---|
| JP | 06267785 | A | * | 9/1994 |
| JP | 2005-195252 | A | | 7/2005 |
| JP | 2007158267 | A | * | 6/2007 |
| JP | 2007-189107 | A | | 7/2007 |

* cited by examiner

*Primary Examiner* — David M Sinclair
(74) *Attorney, Agent, or Firm* — McDermott Will & Emery LLP

(57) ABSTRACT

There is provided a multilayer ceramic electronic component, including: a ceramic body including dielectric layers; first and second internal electrodes disposed to face each other within the ceramic body with the dielectric layer interposed therebetween; and first and second external electrodes electrically connected to the first and second internal electrodes, wherein the ceramic body includes a capacitance forming part contributing to capacitance formation and a non-capacitance forming part provided on at least one of upper and lower surfaces of the capacitance forming part, and when the capacitance forming part is divided into three areas in a thickness direction of the ceramic body, a difference in continuity between internal electrodes in a middle area of the three areas and internal electrodes in upper and lower areas thereof is 1% to 5%.

9 Claims, 5 Drawing Sheets

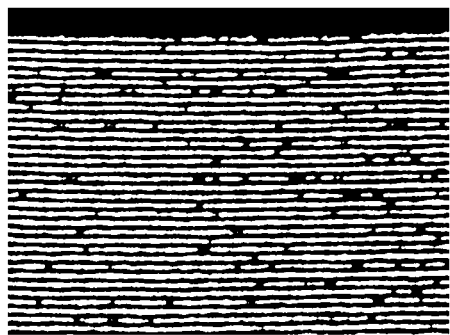
UPPER AREA
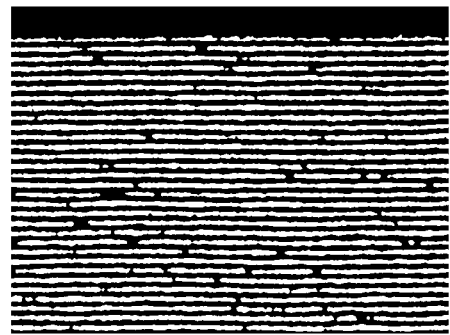
UPPER AREA
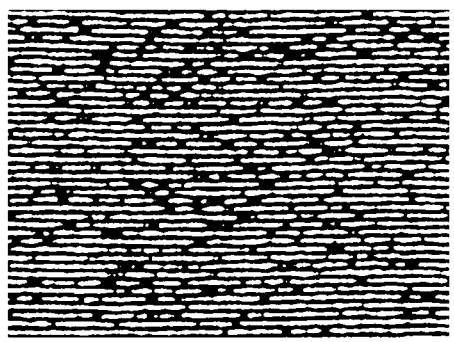
MIDDLE AREA
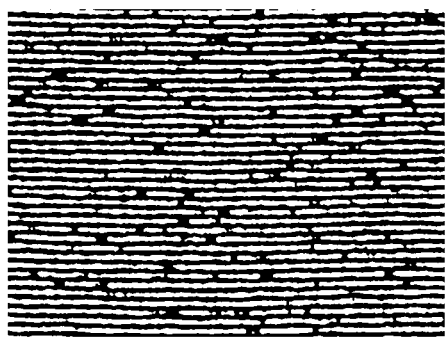
MIDDLE AREA
FIG. 5A
FIG. 5B

MULTILAYER CERAMIC ELECTRONIC COMPONENT HAVING CONTROLLED DIFFERENCE IN CONTINUITY BETWEEN INTERNAL ELECTRODES AND METHOD OF MANUFACTURING THE SAME

CROSS-REFERENCE TO RELATED APPLICATIONS

This application claims the priority of Korean Patent Application No. 10-2012-0097581 filed on Sep. 4, 2012, in the Korean Intellectual Property Office, the disclosure of which is incorporated herein by reference.

BACKGROUND OF THE INVENTION

1. Field of the Invention

The present invention relates to a high capacitance multilayer ceramic electronic component having excellent reliability.

2. Description of the Related Art

In accordance with the recent trend toward miniaturization of electronic products, multilayer ceramic electronic components are also required to be small in size and have high capacitance.

Therefore, dielectric layers and internal electrode layers have been thinned to increase in the number of laminated layers by various methods. Recently, as dielectric layers have been thinned, multilayer ceramic electronic components having an increased number of laminated layers have been manufactured.

As the dielectric layers and the internal electrode layers have been thinned in order to realize high capacitance, the thickness of internal electrode layers may be neither uniform nor continuous, and thus, the internal electrode layers may be partially discontinuous, thereby deteriorating the continuity thereof.

In addition, while the internal electrodes may be discontinuous, the dielectric layers may be partially thickened or thinned, even in the case in which the dielectric layers have the same average thickness, and thus, insulating properties in thinned portions of the dielectric layer may be deteriorated, resulting in deteriorated reliability.

Meanwhile, as the number of laminated layers is increased in order to realize high capacitance, the number of internal electrodes may also be increased, and moreover, continuity rates of the internal electrodes are varied according to positions of the internal electrodes due to a difference in an amount of residual carbon according to the positions of the internal electrodes and in sintering rates of the dielectric layers, at the time of firing a laminate, resulting in deteriorated reliability.

That is, a reduction in capacitance and a deterioration in reliability may occur due to differences in continuity between internal electrodes in a middle area of the multilayer ceramic electronic component and internal electrodes in upper and lower areas thereof.

In order to solve the foregoing problems, attempts at altering the composition of common materials in an internal electrode paste or altering process conditions for firing, calcining, or the like have been made, but sufficient effects may not be obtained thereby.

RELATED ART DOCUMENT (Patent Document 1) Japanese Laid-Open Patent Publication No. 2007-189107

SUMMARY OF THE INVENTION

An aspect of the present invention provides a high capacitance multilayer ceramic electronic component having excellent reliability.

According to an aspect of the present invention, there is provided a multilayer ceramic electronic component, including: a ceramic body including dielectric layers; first and second internal electrodes disposed to face each other within the ceramic body with the dielectric layer interposed therebetween; and first and second external electrodes electrically connected to the first and second internal electrodes, wherein the ceramic body includes a capacitance forming part contributing to capacitance formation and a non-capacitance forming part provided on at least one of upper and lower surfaces of the capacitance forming part, and when the capacitance forming part is divided into three areas in a thickness direction of the ceramic body, a difference in continuity between internal electrodes in a middle area of the three areas and internal electrodes in upper and lower areas thereof is 1% to 5%.

The continuity of the internal electrodes in the upper and lower areas may be 95% or higher.

The dielectric layer may have an average thickness of 0.6 μm or less.

The first and second internal electrodes each may have an average thickness of 0.6 μm or less.

The first and second internal electrodes may include at least one selected from the group consisting of nickel (Ni), copper (Cu), palladium (Pd), and a palladium-silver (Pd—Ag) alloy.

According to another aspect of the present invention, there is provided a method of manufacturing a multilayer ceramic electronic component, the method including: preparing ceramic green sheets by using a slurry containing a ceramic powder; forming internal electrode patterns on the ceramic green sheets using a conductive metal paste; forming a laminate by laminating the ceramic green sheets; and forming a ceramic body including dielectric layers and first and second internal electrodes disposed to face each other with the dielectric layer interposed therebetween, by applying microwaves to the laminate at the time of sintering thereof.

The ceramic body may include a capacitance forming part contributing to capacitance formation and a non-capacitance forming part provided on at least one of upper and lower surfaces of the capacitance forming part, and when the capacitance forming part is divided into three areas in a thickness direction of the ceramic body, a difference in continuity between internal electrodes in a middle area of the three areas and internal electrodes in upper and lower areas thereof may be 1% to 5%.

The continuity of the internal electrodes in the upper and lower areas may be 95% or higher.

The dielectric layer may have an average thickness of 0.6 μm or less.

The first and second internal electrodes each may have an average thickness of 0.6 μm or less.

The number of laminated ceramic green sheets may be 400 or more.

The conductive metal paste may include at least one selected from the group consisting of nickel (Ni), copper (Cu), palladium (Pd), and a palladium-silver (Pd—Ag) alloy.

BRIEF DESCRIPTION OF THE DRAWINGS

The above and other aspects, features and other advantages of the present invention will be more clearly understood from the following detailed description taken in conjunction with the accompanying drawings, in which:

FIGS. 5A and 5B are microscopic images illustrating continuity of internal electrodes according to the positions of internal electrodes in Comparative Example (FIG. 5A) and Inventive Example (FIG. 5B) of the present invention.

DETAILED DESCRIPTION OF THE INVENTION

Figure 1:
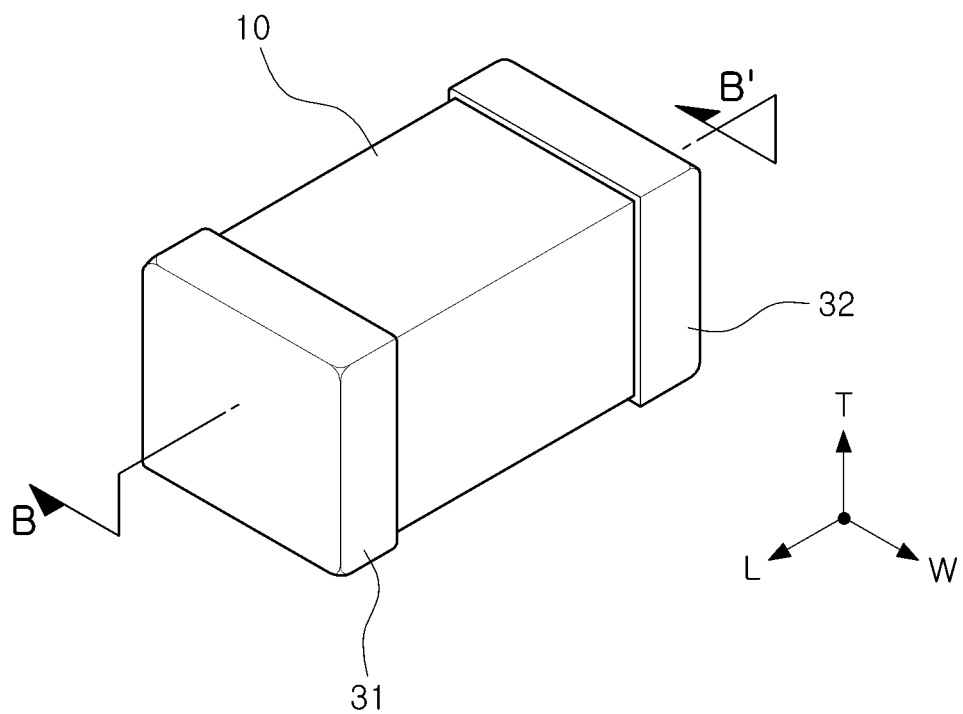
FIG. 1 is a perspective view schematically illustrating a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

FIG. 1 is a perspective view schematically illustrating a multilayer ceramic capacitor according to an embodiment of the present invention.

Figure 2:
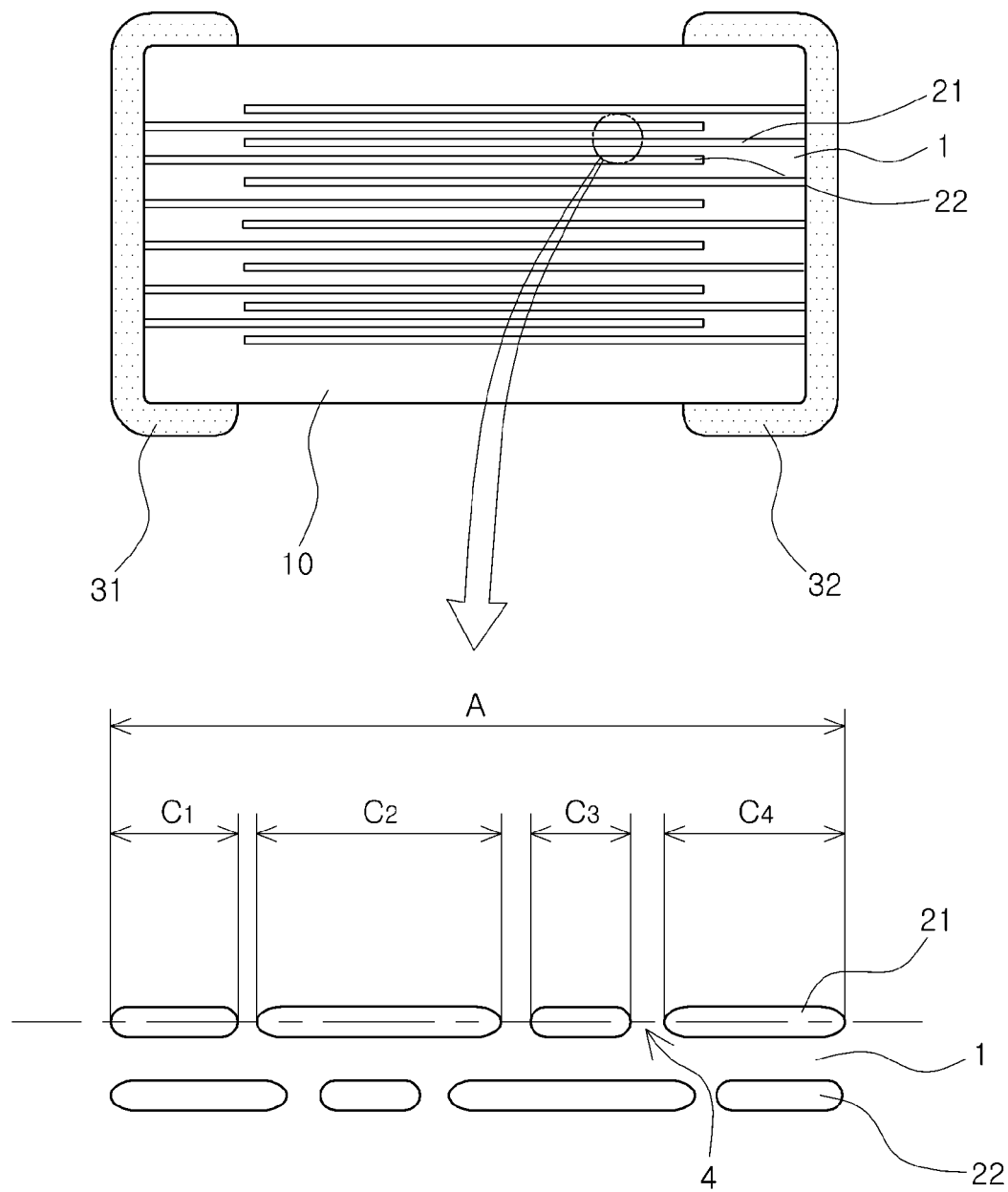
FIG. 2 is a cross-sectional view of FIG. 1 taken along line B-B' and an enlarged view illustrating continuity of internal electrodes.

FIG. 2 is a cross-sectional view of FIG. 1 taken along line B-B' and an enlarged view illustrating continuity of internal electrodes.

Figure 3:
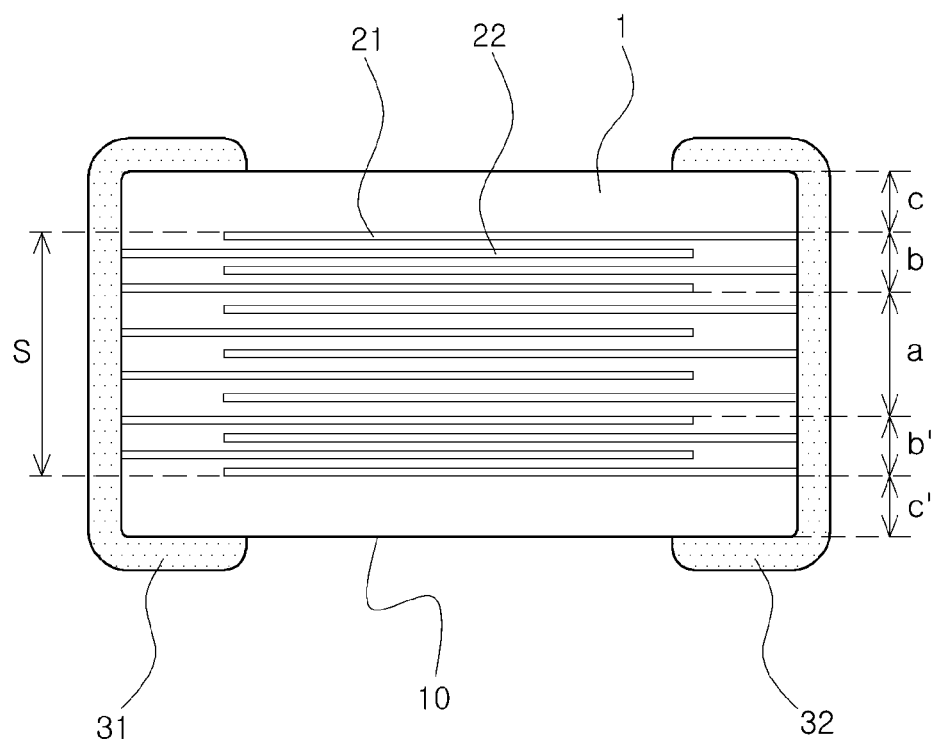
FIG. 3 is a cross-sectional view of FIG. 1 taken along line B-B', schematically illustrating continuity of internal electrodes according to areas of a ceramic body in which the internal electrodes are provided.

FIG. 3 is a cross-sectional view of FIG. 1 taken along line B-B', schematically illustrating continuity of internal electrodes according to areas of a ceramic body in which the internal electrodes are provided.

Referring to FIGS. 1 to 3, a multilayer ceramic electronic component according to an embodiment of the present invention may include: a ceramic body 10 including dielectric layers 1; first and second internal electrodes 21 and 22 disposed to face each other within the ceramic body 10 with the dielectric layer 1 interposed therebetween; and first and second external electrodes 31 and 32 electrically connected to the first and second internal electrodes 21 and 22, respectively. Here, the ceramic body 10 may include a capacitance forming part (S) contributing to capacitance formation and a non-capacitance forming part (c or c') provided on at least one of upper and lower surfaces of the capacitance forming part. Here, when the capacitance forming part (S) is divided into three areas in a thickness direction of the ceramic body 10, a difference in continuity between internal electrodes in a middle area (a) and internal electrodes in upper and lower areas (b and b') is 1% to 5%

Hereinafter, a multilayer ceramic electronic component according to an embodiment of the present invention, in particular, a multilayer ceramic capacitor, will be described, but the present invention is not limited thereto.

The ceramic body 10 may have, but is not particularly limited to, for example, a hexahedral shape.

Meanwhile, with respect to the multilayer ceramic capacitor according to the present embodiment, a 'length direction', a 'width direction', and a 'thickness direction' are designated by 'L', 'W', and 'T' in FIG. 1, respectively. Here, the 'thickness direction' may refer to a direction in which the dielectric layers are laminated, that is, a 'lamination direction'.

The multilayer ceramic electronic component according to an embodiment of the present invention may include: a ceramic body 10 including dielectric layers 1; first and second internal electrodes 21 and 22 disposed to face each other within the ceramic body 10 with the dielectric layer 1 interposed therebetween; and first and second external electrodes 31 and 32 electrically connected to the first and second internal electrodes 21 and 22, respectively.

The first and second internal electrodes 21 and 22 may be formed by using a conductive paste made of at least one of, for example, precious metals, such as palladium (Pd), palladium-silver (Pd—Ag) alloy, and the like, nickel (Ni), and copper (Cu), but are not particularly limited thereto.

The external electrodes 31 and 32 may be formed on external surfaces of the ceramic body 10 in order to form capacitance, and may be electrically connected to the first and second internal electrodes 21 and 22, respectively.

The external electrodes 31 and 32 may be formed of the same conductive material as the internal electrodes, but are not limited thereto, and may be formed of, for example, copper (Cu), silver (Ag), nickel (Ni), or the like.

The external electrodes 31 and 32 may be formed by coating the ceramic body 10 with a conductive paste prepared by adding glass frit to a metal powder, followed by sintering.

According to the embodiment of the present invention, an average thickness of the dielectric layer 1 may be 0.6 µm or less.

In the embodiment of the present invention, the thickness of the dielectric layer 1 may refer to an average thickness of the dielectric layer 1 disposed between the first and second internal electrodes 21 and 22.

The average thickness of the dielectric layer 1 may be measured from an image obtained by scanning a cross section of the ceramic body 10 in a length direction thereof using a scanning electron microscope (SEM), as shown in FIG. 2.

For example, as shown in FIG. 2, with respect to a dielectric layer extracted from the image obtained by scanning the cross-section of the ceramic body 10 in a length-thickness (L-T) direction, cut in a central portion of the ceramic body 10 in a width (W) direction thereof, using a scanning electron microscope (SEM), the average thickness thereof may be obtained by measuring thicknesses thereof at 30 equidistant points in the length direction thereof, and then averaging the measured thicknesses.

The thicknesses at 30 equidistant points may be measured in a capacitance forming part, an area in which the first and second internal electrodes 21 and 22 overlap.

In addition, when this measurement for obtaining the average thickness is extensively performed on ten or more dielectric layers and an average measurement value is calculated, the average thickness of the dielectric layer may be further generalized.

According to the present embodiment, the ceramic body 10 may include the capacitance forming part (S), and the non-capacitance forming part (c or c') provided on at least one of the upper and lower surfaces of the capacitance forming part (S).

When the capacitance forming part (S) is divided into three areas in the thickness direction of the ceramic body 10, a difference in continuity between internal electrodes in a middle area and internal electrodes in upper and lower areas may be 1% to 5%

As such, a multilayer ceramic electronic component having excellent reliability may be obtained by controlling the difference in continuity between the internal electrodes in the middle area (a) and the internal electrodes in the upper and lower areas (b and b') to be within 1% to 5%.

That is, in the case of an ultra-small model of which the dielectric layer 1 has an average thickness of 0.6 µm or less, continuity of the first and second internal electrodes 21 and 22 may be deteriorated. In the case of a high-capacitance model, as the number of laminated layers is increased, the continuity of internal electrodes may be different in internal electrodes in the upper area, internal electrodes in the middle area, and internal electrodes in the lower area in the thickness direction of the ceramic body.

Due to the difference in the continuity of the internal electrodes according to the areas of the ceramic body in which the internal electrodes are provided, a reduction in capacitance and deterioration in reliability may occur.

However, according to the embodiment of the present invention, the foregoing problems may be solved by controlling the difference in continuity between the internal electrodes in the middle area (a) and the internal electrodes in the upper and lower areas (b and b') to be within 1% to 5%.

In the case in which the difference in the continuity of the internal electrodes between the internal electrodes in the middle area (a) and the internal electrodes in the upper and lower areas (b and b') in the thickness direction of the ceramic body 10 is below 1%, cracks may occur, resulting in deteriorated reliability.

In addition, in the case in which the difference in the continuity of the internal electrodes between the internal electrodes in the middle area (a) and the internal electrodes in the upper and lower areas (b and b') in the thickness direction of the ceramic body 10 is above 5%, there may be problems in terms of capacitance, the occurrence of cracks, and reliability.

Details for a method of controlling a difference in continuity of internal electrodes will be described later.

In addition, in the case in which the dielectric layer 1 has an average thickness of 0.6 µm or less, the internal electrodes may be discontinuous and the dielectric layer may be partially thickened or thinned, even in the case that the dielectric layer has the same average thickness, and thus, insulating properties in the thinned portions of the dielectric layer may be deteriorated, resulting in deteriorated reliability. However, according to the embodiment of the present invention, insulating properties may be improved by increasing the continuity of the internal electrodes.

In the case in which the average thickness of the dielectric layer 1 is above 0.6 µm, the dielectric layer is thick, and thus, the above problems in terms of insulating properties and reliability may not occur.

Meanwhile, the average thickness of the first and second internal electrodes 21 and 22 after firing is not particularly limited, as long as capacitance can be formed thereby, and, for example, may be 0.6 µm or less.

The average thickness of the first and second internal electrodes 21 and 22 may be measured from the image obtained by scanning the cross section of the ceramic body 10 in the length direction thereof, using a scanning electron microscope (SEM), as shown in FIG. 2.

For example, as shown in FIG. 2, with respect to an internal electrode extracted from the image obtained by scanning the cross-section of the ceramic body 10 in the length-thickness (L-T) direction, cut in the central portion of the ceramic body 10 in the width (W) direction thereof, and then averaging the measured thicknesses, the average thickness thereof may be obtained by measuring thicknesses at 30 equidistant points in the length direction thereof, and then averaging the measured thicknesses.

The thicknesses at 30 equidistant points may be measured in the capacitance forming part, in which the first and second internal electrodes 21 and 22 overlap.

In addition, when this measurement for obtaining the average thickness is extensively performed on ten or more internal electrodes and then an average measurement value is calculated, the average thickness of the internal electrodes may be further generalized.

Referring to FIGS. 2 and 3, in the multilayer ceramic electronic component according to the embodiment of the present invention, the continuity of the internal electrodes in the upper and lower areas (b and b') may be 95% or higher.

The continuity of an internal electrode may be defined as a ratio of an actual total length of electrode portions to an ideal total length of the first or second internal electrode 21 or 22.

For example, the continuity of internal electrodes may be measured from the image obtained by scanning the cross section of the ceramic body 10 in the length direction thereof using a scanning electron microscope (SEM), as shown in FIG. 2.

Specifically, as shown in FIG. 2, with respect to an internal electrode extracted from the image obtained by scanning the cross section of the ceramic body 10 in the length-thickness (L-T) direction, cut in the central portion of the ceramic body 10 in the width (W) direction thereof, using a scanning electron microscope (SEM), the continuity thereof may be obtained by measuring the actual total length of the electrode portions of the internal electrode based on the ideal total length of the internal electrode.

The continuity of the internal electrode may be measured in the capacitance forming part (S), referring to an area in which the first and second internal electrodes 21 and 22 overlap.

Specifically, as shown in FIG. 2, when the ideal total length of the first or second internal electrode 21 or 22 in any one portion thereof is defined as A and actual total lengths of the electrode portions are defined as $c_1, c_2, c_3, \ldots,$ and $c_n$, the continuity of the internal electrode may be expressed by $(c_1+c_2+c_3+\cdots+c_n)/A$. In FIG. 2, although the electrode portions are expressed by $c_1, c_2, c_3$ and $c_4$, but the number of electrode portions is not particularly limited.

In addition, the continuity of the internal electrode may refer to a coverage ratio of the internal electrode, and may be defined as a ratio of an actual total area of the electrode portions to an ideal total area of the internal electrode.

The continuity $(c_1+c_2+c_3+c_4/A)$ of the first or second internal electrode 21 or 22 may be variously realized according to a method to be described below, and in the multilayer ceramic electronic component according to the embodiment of the present invention, the continuity of the internal electrodes in the upper and lower areas (b and b') of the ceramic body 10 may be 95% or higher.

In addition, discontinuous portions 4 of the first and second internal electrodes 21 and 22 may be pores or ceramics.

In order to realize the continuity $(c_1+c_2+c_3+c_4/A)$ of the first and second internal electrodes 21 and 22 as 95% or higher, the size of metal powder particles in a conductive paste for forming the internal electrodes may be varied or the amount of an organic material and a ceramic material added thereto may be controlled.

In addition, a temperature rise rate and a sintering atmosphere may be adjusted during a sintering process to thereby control the continuity of the internal electrodes.

According to the embodiment of the present invention, in order to realize the continuity of the first and second internal electrodes 21 and 22 as 95% or higher and control the difference in continuity between the internal electrodes in the middle area (a) and the internal electrodes in the upper and lower areas (b and b') in the thickness direction of the ceramic body 10 to be within 1% to 5%, the sintering atmosphere may be controlled during the sintering process of the ceramic body.

According to the embodiment of the present invention, there may be manufactured a high-capacitance multilayer ceramic capacitor having increased capacitance and excellent reliability, by realizing the continuity of the first and second internal electrodes 21 and 22 as 95% or higher and controlling the difference in continuity between the internal electrodes in the middle area (a) and the internal electrodes in the upper and lower areas (b and b') in the thickness direction of the ceramic body 10 to be within 1% to 5%.

Figure 4:
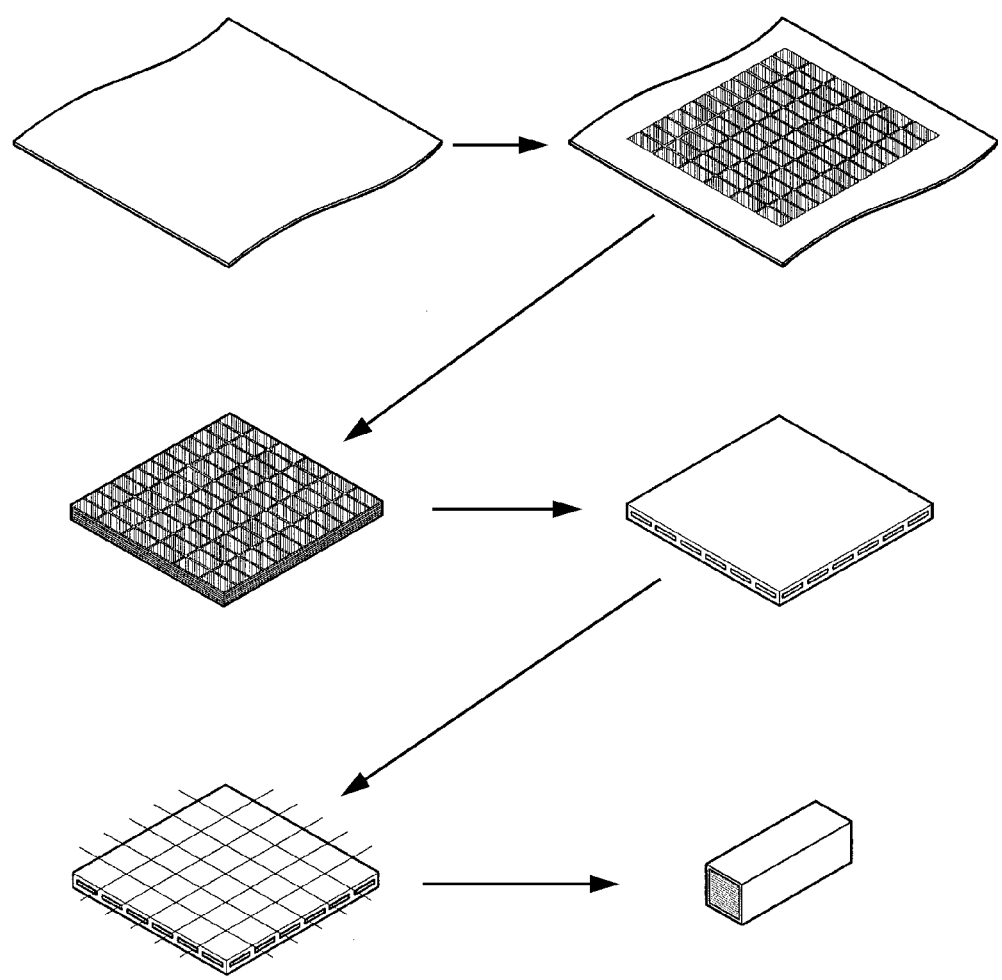
FIG. 4 is a view illustrating a process of manufacturing a multilayer ceramic capacitor according to another embodiment of the present invention.

FIG. 4 is a view illustrating a process of manufacturing a multilayer ceramic capacitor according to another embodiment of the present invention.

Referring to FIG. 4, a method of manufacturing a multilayer ceramic electronic component according to another embodiment of the present invention may include: preparing ceramic green sheets by using a slurry containing a ceramic powder; forming internal electrode patterns on the ceramic green sheets using a conductive metal paste; forming a laminate by laminating the ceramic green sheets; and forming a ceramic body including dielectric layers and first and second internal electrodes disposed to face each other with the dielectric layer interposed therebetween, by applying microwaves to the laminate at the time of sintering thereof.

In addition, the ceramic body includes a capacitance forming part contributing to capacitance formation and a non-capacitance forming part provided on at least one of upper and lower surfaces of the capacitance forming part, and when the capacitance forming part is divided into three areas in a thickness direction of the ceramic body, a difference in continuity between internal electrodes in a middle area of the three areas and internal electrodes in upper and lower areas thereof is 1% to 5%.

Hereinafter, the method of manufacturing a multilayer ceramic electronic component according to another embodiment of the present invention will be described in detail, but descriptions of the same characteristics as those of the multilayer ceramic electronic component according to the above-described embodiment of the present invention will be omitted in order to avoid repeated explanations.

The method of manufacturing a multilayer ceramic electronic component according to another embodiment of the present invention, like general manufacturing methods, may include: preparing ceramic green sheets by using a slurry containing a ceramic powder; forming internal electrode patterns on the ceramic green sheets using a conductive metal paste; and forming a laminate by laminating the ceramic green sheets.

Then, according to another embodiment of the present invention, the method may further include forming a ceramic body including dielectric layers and first and second internal electrodes disposed to face each other with the dielectric layer interposed therebetween, by applying microwaves to the laminate at the time of the sintering thereof.

Generally, when the multilayer ceramic electronic component is manufactured, a sintering furnace employing convection currents is used at the time of sintering the laminate.

In the case in which the laminate is sintered by the foregoing sintering method, the internal electrodes are sintered by conduction and transfer of heat from a surface of the laminate to an inside thereof.

That is, since the internal electrodes are densified by conduction and transfer of heat from the surface of the laminate to the inside thereof, there may be a difference in a sintering rate between the surface of the laminate and the internal electrodes inside the laminate in the case in which a fine-grained metal powder is used.

The change in physical properties of the ceramic body and the difference in continuity between the internal electrodes in the middle area of the ceramic body and the internal electrodes in the upper and lower areas thereof may occur, according to an oxidizing or reducing atmosphere within the sintering furnace.

According to another embodiment of the present invention, the application of microwaves is performed at the time of sintering the laminate, thereby reducing the change in physical properties of the ceramic body and the difference in continuity between the internal electrodes in the middle area of the ceramic body and the internal electrodes in the upper and lower areas thereof, after sintering.

In the case of using the microwaves, when an electric field of electromagnetic waves is positively and negatively vibrated, polar molecules are aligned along electromagnetic field lines while changing positive and negative directions thereof and rotating significantly fast.

Here, the molecules push and pull each other or collide with each other due to rotation thereof. This kinetic energy is converted into heat energy, and thus, equivalent heat energy is applied to all regions within a sample, and as a result, local sintering density may be prevented and uniform sintering may be implemented.

In this manner, according to another embodiment of the present invention, the continuity of the internal electrodes in the multilayer ceramic electronic component may be improved, and thus electric characteristics thereof may be improved.

The number of laminated ceramic green sheets is not particularly limited, and may be, for example, 400 or more in order to manufacture a high-capacity multilayer ceramic electronic component.

In the case in which the number of laminated layers is below 400, the dielectric layers and the internal electrodes may be overly thick, and thus, there may be no problems with the continuity of the internal electrodes and withstand voltage characteristics.

That is, only in the case in which the number of laminated layers is 400 or more, the dielectric layers become thin, and thus, there may be problematic in terms of the continuity of the internal electrodes, resulting in deteriorated withstand voltage characteristics.

The conductive metal paste may contain at least one selected from the group consisting of nickel (Ni), copper (Cu), palladium (Pd), and a palladium-silver (Pd—Ag) alloy, but is not particularly limited thereto.

Hereafter, the present invention will be described in detail with reference to examples, but is not limited thereto.

In the Inventive Examples, a test was performed on each multilayer ceramic capacitor having a dielectric layer 1 with an average thickness of 0.6 μm or less, in order to evaluate improvements in reliability according to a difference in continuity between internal electrodes in a middle area and internal electrodes in upper and lower areas when a capacitance forming part is divided into three areas in a thickness direction of a ceramic body.

Each multilayer ceramic capacitor according to the inventive examples was manufactured as follows.

First, a slurry containing a powder of barium titanate (BaTiO$_3$) or the like, having an average particle size of 0.1 μm, was coated on carrier films, followed by drying, to thereby prepare a plurality of ceramic green sheets having a thickness of 1.05 μm or 0.95 μm.

Next, a conductive paste for internal electrodes was prepared by using 50 wt % of a nickel powder, an organic binder, a dispersant, an organic solvent, and the like.

The conductive paste for internal electrodes was coated on the ceramic green sheets by a screen printing method, to thereby form internal electrodes, and then the resulting structures were laminated in amounts of 400 to 500 layers to thereby manufacture a laminate.

Thereafter, compressing and cutting were performed to produce 1005 standard-sized chips, and each chip was sintered at a temperature of 1050° C. to 1200° C. under a reducing atmosphere of H$_2$ of 0.1% or less.

In the Inventive Examples, the sintering process was performed by using microwaves.

Next, an external electrode forming process, a plating process, and the like were performed to manufacture a multilayer ceramic capacitor.

Multilayer ceramic capacitors according to Comparative Examples were manufactured by the same method as in the above inventive examples, except that a general sintering furnace was used, but microwaves were not used in the sintering stage.

In addition, the continuity of internal electrodes was determined by measuring the continuity of internal electrodes in the capacitance forming part, on the cross section of the ceramic body 10 in the length-thickness (L-T) direction, cut in the central portion of the ceramic body in the width (W) direction thereof.

With respect to an image obtained by scanning ten extracted internal electrodes, a ratio of an actual total length of electrode portions of the internal electrodes to an ideal total length of the internal electrodes were measured in order to determine the continuity of the internal electrodes.

Table 1 below compares the multilayer ceramic capacitors according to the Inventive and Comparative Examples in terms of capacitance, crack occurrence, and reliability according to a difference in continuity between the internal electrodes in the middle area of the ceramic body and the internal electrodes in the upper and lower areas thereof.

TABLE 1

| | Difference in Continuity of Internal Electrode (%) | Capacitance | Crack Occurrence | Reliability | Sintering Method |
|---|---|---|---|---|---|
| Comparative Example 1 | 0~1 | ◎ | X | X | Microwaves |
| Inventive Example 1 | 1~3 | ◎ | ○ | ◎ | Microwaves |
| Inventive Example 2 | 3~5 | ◎ | ◎ | ◎ | Microwaves |
| Comparative Example 2 | 5~7 | ○ | ◎ | ○ | General Sintering |
| Comparative Example 3 | 7~10 | ○ | ○ | ○ | General Sintering |
| Comparative Example 4 | Above 10 | ○ | Δ | X | General Sintering |

◎: Excellent
○: Very good
Δ: Good
X: Poor

Referring to Table 1, it can be seen that in Comparative Example 1, in which the difference in continuity of internal electrodes was below 1%, cracks and problems in reliability occurred.

It can be seen that Comparative Examples 2 to 4, in which the difference in continuity of internal electrodes was above 5% had problems in terms of capacitance, cracking, and reliability.

Whereas, it can be seen that Inventive Examples 1 and 2, in which the difference in continuity of internal electrodes was 1% to 5%, had excellent effects in capacitance, cracking, and reliability tests.

FIGS. 5A and 5B are microscopic images illustrating continuity of internal electrodes according to the positions of the internal electrodes in the Comparative Example (FIG. 5A) and the Inventive Example (FIG. 5B) of the present invention.

FIG. 5A shows images of the internal electrodes of the Comparative Example in which the difference in continuity between the internal electrodes in the middle area and the internal electrodes in the upper area was above 10%, and FIG. 5B shows images of the internal electrodes of the Inventive Example in which the difference in continuity between the internal electrodes in the middle area and the internal electrodes in the upper area was 1% to 5%.

As set forth above, according to embodiments of the present invention, there may be provided a high capacitance multilayer ceramic electronic component having excellent accelerated lifespan performance, withstand voltage characteristics, and reliability, while realizing high capacitance, by decreasing a difference in continuity of internal electrodes according to the positions of the internal electrodes.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body including dielectric layers;
   first and second internal electrodes disposed to face each other within the ceramic body with the dielectric layer interposed therebetween; and
   first and second external electrodes electrically connected to the first and second internal electrodes,
   wherein the ceramic body includes a capacitance forming part contributing to capacitance formation and a non-capacitance forming part provided on at least one of upper and lower surfaces of the capacitance forming part, when the capacitance forming part is divided into three areas in a thickness direction of the ceramic body, a difference in continuity between internal electrodes in a middle area of the three areas and internal electrodes in upper and lower areas thereof is greater than 1% and less than 5%, and the continuity of the internal electrodes in the upper and lower areas is 95% or higher.

2. The multilayer ceramic electronic component of claim 1, wherein the dielectric layer has an average thickness of 0.6 μm or less.

3. The multilayer ceramic electronic component of claim 1, wherein the first and second internal electrodes each have an average thickness of 0.6 μm or less.

4. The multilayer ceramic electronic component of claim 1, wherein the first and second internal electrodes include at least one selected from the group consisting of nickel (Ni), copper (Cu), palladium (Pd), and a palladium-silver (Pd—Ag) alloy.

5. A method of manufacturing a multilayer ceramic electronic component, the method comprising:

preparing ceramic green sheets by using a slurry containing a ceramic powder;

forming internal electrode patterns on the ceramic green sheets using a conductive metal paste;

forming a laminate by laminating the ceramic green sheets; and forming a ceramic body including dielectric layers and first and second internal electrodes disposed to face each other with the dielectric layer interposed therebetween, by applying microwaves to the laminate at the time of sintering thereof, wherein the ceramic body includes a capacitance forming part contributing to capacitance formation and a non-capacitance forming part provided on at least one of upper and lower surfaces of the capacitance forming part, when the capacitance forming part is divided into three areas in a thickness direction of the ceramic body, a difference in continuity between internal electrodes in a middle area of the three areas and internal electrodes in upper and lower areas thereof is greater than 1% and less than 5%, and the continuity of the internal electrodes in the upper and lower areas is 95% or higher.

6. The method of claim 5, wherein the dielectric layer has an average thickness of 0.6 μm or less.

7. The method of claim 5, wherein the first and second internal electrodes each have an average thickness of 0.6 μm or less.

8. The method of claim 5, wherein the number of laminated ceramic green sheets is 400 or more.

9. The method of claim 5, wherein the conductive metal paste includes at least one selected from the group consisting of nickel (Ni), copper (Cu), palladium (Pd), and a palladium-silver (Pd—Ag) alloy.

* * * * *